United States Patent [19]

Ardaud et al.

[11] Patent Number: 5,015,607

[45] Date of Patent: May 14, 1991

[54] PREPARATION OF BORON/NITROGEN PRECERAMIC POLYMERS

[75] Inventors: Pierre Ardaud, Sainte Foy les Lyon; Jean-Jacques LeBrun, Pierre Benite; Gerard Mignani, Lyon, all of France

[73] Assignee: Rhone-Poulenc Chimie, Courbevoie, France

[21] Appl. No.: 332,076

[22] Filed: Apr. 3, 1989

[30] Foreign Application Priority Data

Apr. 1, 1988 [FR] France ................ 88 04365

[51] Int. Cl.$^5$ ................ C04B 35/46; C04B 35/48
[52] U.S. Cl. ................ 501/96; 264/65
[58] Field of Search ................ 501/96; 264/65

[56] References Cited

U.S. PATENT DOCUMENTS

| | | | |
|---|---|---|---|
| 4,565,747 | 1/1986 | Nakae et al. | 428/698 |
| 4,581,468 | 4/1986 | Paciorek | 556/403 |
| 4,590,034 | 5/1986 | Hirano et al. | 419/13 |
| 4,714,599 | 12/1987 | Sato et al. | 423/290 |
| 4,857,490 | 8/1989 | Johnson | 501/96 |
| 4,865,830 | 9/1989 | Klabunde et al. | 423/412 |
| 4,939,222 | 7/1990 | Mignani et al. | 528/5 |

OTHER PUBLICATIONS

Buro, A. B. and Banus, J., *"The Reaction of Boron Trifluoride with Tetramethylamino Borine"*, J. Am. Chem. Soc., 76, p. 3903, Aug. 5, 1954.

*Primary Examiner*—William R. Dixon, Jr.
*Assistant Examiner*—Alan A. Wright
*Attorney, Agent, or Firm*—Burns, Doane, Swecker & Mathis

[57] ABSTRACT

Boron/nitrogen preceramic polymers are prepared by reacting (a) the product of mass thermolysis of a compound of Formula (1):

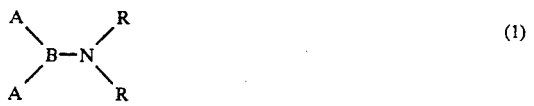

in which A is a halogen atom and R is a hydrogen atom, a hydrocarbon radical, or an organosilyl or hydrogenoorganosilyl radical, with (b) an amino compound containing at least one —NH$_2$ group; the resulting polymers are facilely pyrolyzed into boron nitride ceramic materials.

20 Claims, No Drawings

PREPARATION OF BORON/NITROGEN PRECERAMIC POLYMERS

CROSS-REFERENCE TO RELATED APPLICATIONS

Copending applications, Ser. Nos. 07/242,907, 07/242,977 and 07/243,827 each filed Sept. 12, 1988 and each assigned to the assignee hereof.

BACKGROUND OF THE INVENTION

1. Field of the Invention

The present invention relates to the preparation of polymers based on boron and nitrogen, and to the use of such polymers in the production of ceramic materials and shaped articles based on boron nitride, especially boron nitride in fibrous form.

This invention also relates to certain novel compositions which are especially adopted for the synthesis of such polymers based on boron and nitrogen.

2. Description of the Prior Art

Boron nitride is a material increasingly in demand in this art, in light of its stability at elevated temperatures, its impact strength, its great chemical inertness and its very good thermal conductivity. Furthermore, its low electrical conductivity makes it an insulating material of choice.

Various processes are pressently known to the art for the preparation of boron nitride.

One such process includes reacting boron trichloride with ammonia in the gaseous state. A fine boron nitride powder is obtained in this manner, which may be sintered to produce solid shaped articles. However, the shaped articles thus produced exhibit a characteristic microporosity which may be highly detrimental for certain applications.

More recently, it was discovered that boron nitride could be produced by the pyrolysis of precursor polymers.

The advantage of this "polymer" method primarily resides in the form of the final product, and, more particularly, enables the production, after pyrolysis, of boron nitride fibers.

Thus, in U.S. Pat. No. 4,581,468 a preceramic organoboron polymer is described which is prepared by the interaction of ammoia (ammonolysis) with a B-trichloro-N-tris(trialkylsilyl)borazine (a cyclic compound) and which, as indicated, after drawing and pyrolysis at 970° C., results in the production of boron nitride fibers.

However, the beginning cyclic compound described in this patent is difficult to prepare and is thus expensive. Consequently, it is not realistically suitable for production on an industrial scale.

More specifically, this cyclic compound is prepared by the thermolysis in xylene, at reflux, of a dichloro(-trialkylsilylamino)borane having the formula:

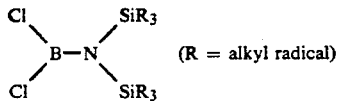

(R = alkyl radical)

Such a process presents the dual disadvantage, on the one hand, of giving a low yield (on the order of 20%), and, on the other, of requiring the use of an organic solvent with all of the necessary precautions and additional cost resulting therefrom (safety, elimination of the solvent, loss of solvent, etc.).

Finally, the maximum yield by weight of boron nitride that can be produced by pyrolysis of an organometallic polymer synthesized from said cyclic compound, may be insufficient.

SUMMARY OF THE INVENTION

Accordingly, a major object of the present invention is the provision of a simple, efficient, economical and readily applicable improved process for the preparation of organometallic polymers based on boron and nitrogen in a wide variety of forms (filaments, fibers, wires, molded shaped articles, coatings, films, foils, and the like), and which various forms are facilely converted in high yields by weight, upon pyrolysis, into useful materials based on boron nitride.

Briefly, the present invention features a process for the preparation of polymers based on boron and nitrogen, comprising reacting (a) a composition produced by the mass thermolysis of at least one compound of the Formula (1):

in which A is a halogen atom and R is a hydrogen atom, a hydrocarbon radical, or an organosilyl or hydrogenoorganosilyl radical, with (b) a compound containing at least one NH$_2$ group.

DETAILED DESCRIPTION OF THE PREFERRED EMBODIMENTS OF THE INVENTION

More particularly according to the present invention, for the sake of simplicity, the term "thermolysis" is used to designate the individual process for preparing the aforementioned starting material composition and the term "overall process" is used to designate the process in its entirety for the synthesis of the polymer precursors.

The thermolysis procedure will now be described, followed by a description of the overall process, as well as the various different embodiments thereof.

Thermolysis

The starting material compound of Formula (1) is typically a chlorine compound, although A radicals which are fluorine, bromine or iodine atoms are within the scope of the invention.

The hydrocarbon radicals R are advantageously alkyl, cycloalkyl, aryl, alkylaryl and arylalkyl radicals, as well as alkenyl and alkynyl radicals.

Representative such alkyl radicals include methyl, ethyl, propyl, butyl, pentyl, hexyl, heptyl and octyl radicals. Representative cycloalkyl radicals include the cyclopentyl, cyclohexyl and cycloheptyl radicals. Exemplary aryl radicals are phenyl and naphthyl, and exemplary alkylaryl radicals are the tolyl and xylyl radicals. Representative arylalkyl radicals are the benzyl and phenylethyl radicals.

Illustrative of the alkenyl radicals are the vinyl, allyl, butenyl and pentenyl radicals.

Illustrative alkynyl radicals are ethynyl, propynyl and butynyl radicals.

In a preferred embodiment of the invention, the R radical is an organosilyl radical, and more particularly a (triorgano)silyl radical. Even more preferably, R is a (triorgano)silyl radical, such as, in particular, a trimethyl, triethyl, tripropyl, tributyl, tripentyl trihexyl, triheptyl or trioctylsilyl radical.

The compounds of Formula (1) are well known to this art and may be prepared by any known means.

For example, in the case where these compounds contain R radicals of the alkyl type, see Wilberg and Schuster (*Zeitschrift fur Anorganische Chemie*, 213, page 77 (1933)), Brown (*Journal of the American Chemical Society*, 74, page 1219 (1952)), or Burg and Banus (*Journal of the American Chemical Society*, 76, page 3903 (1954)).

Concerning the case where these compounds contain radicals R of the triorganosilyl type, see Jenne and Niedenzu (*Inoroanic Chemistry*, 3, 68 (1964)), Sujishii and Witz (*Journal of the American Ceramic Society*, 79, page 2447 (1957)), or Wannagat (*Angew. Chemie, International Edition*, 3, page 633 (1964)).

In general, the desired compound of Formula (1):

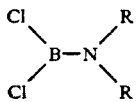

may be prepared by the action of BCl$_3$ on

under suitable conditions of temperature and molar ratio.

In an essential embodiment of the process according to the invention, it is critical that the thermolysis of the compound of Formula (1) be carried out in mass.

This requirement makes it possible to resolve a dual problem:

(a) on the one hand, the use of an organic solvent medium is avoided, permitting larger apparatus to be used and enhancing the economy of the process; and (b) on the other, such thermolysis permits numerous cyclic compounds to be produced in good yields, i.e., around 60%.

According to the invention, this mass thermolysis is typically carried out at a temperature of from 100° to 300° C., and preferably at about 200° C., with the upper temperature limits being dictated by the temperatures at which the reagents and/or products of the reaction begin to be degraded.

The duration of the thermolysis may extend from several hours of tens of hours. In general, the higher the temperature of the reaction, the shorter its duration.

Upon completion of the thermolysis, a composition is produced containing unreacted compound of Formula (1) and a mixture of cyclic polymers having different structures.

Thus, in the particular case of a mass thermolysis of a starting material compound of the formula:

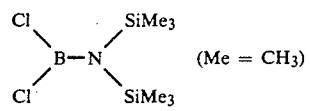

analysis shows, within the structure of such cyclic polymers, the presence of units of the types:

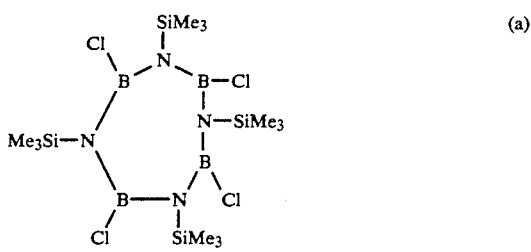

and/or isomers

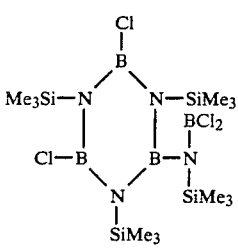

and/or isomers

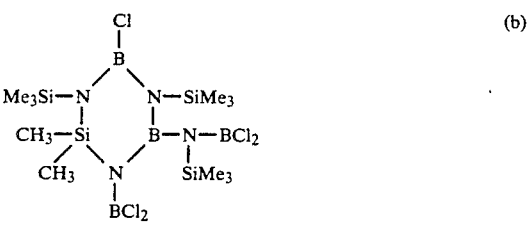

and/or isomers

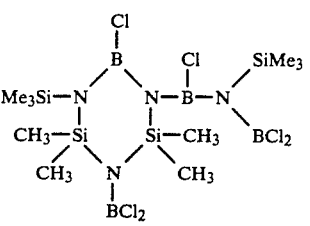

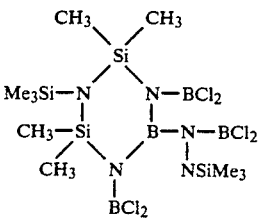

It will clearly be seen that the cyclic polymers obtained via this process are different from the cyclic polymer described in U.S. Pat. No. 4,581,468, corresponding essentially to the formula:

The cyclic polymers according to the invention may be separated by any known means, if so desired, from the mixture resulting from the thermolysis, in particular by evaporation under vacuum of the fraction of the compounds of Formula (1) that have not reacted; the cyclic polymers are then in a solid form.

As explained below, the overall process of the invention may then be carried out either using the composition directly resulting from the thermolysis reaction, or using only the fraction of cyclic polymers separated from such composition.

Overall Process

The compounds containing at least one NH$_2$ group which are reacted according to the overall process, are designated aminolysis reagents generally (an amine compound containing at least one NH$_2$ group) and an ammonolysis reagent in the more particular case where ammonia is used.

Also, and in consequence of the above, the reaction products resulting from the overall process shall hereinafter be designated, depending on the particular case, aminolysates or ammonolysates, with the latter of course being included in the more generic class of "aminolysates".

Concerning the aminolysis reagents according to the present invention, ammonia, the primary amines, the diamines (hydrazine, alkylhydrazine, hydrazide, alkylenediamines, etc.), the amides, the silylamines, and the like, are exemplary.

Preferably, compounds having the following general Formula (2) are used:

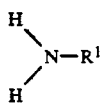

wherein the radical R$^l$ is a hydrogen atom, or a hydrocarbon or silyl radical. The following are particularly suitable:

(i) ammonia (R$^1$ = hydrogen atom);

(ii) the primary organoamines (R$^1$ = alkyl, cycloalkyl, aryl, alkylaryl or arylalkyl radicals), such as, for example, methylamine, ethylamine, propylamine, butylamine, pentylamine, hexylamine, heptylamine and octylamine, cyclopropylamine, phenylamine, and the like.

(iii) silylamines and more particularly the triorganosilylamines or the hydrogenoorganosilylamines, such as (hydrogenodimethylsilyl)amine.

The preferred aminolysis reagents are the primary alkylamines and ammonia.

As indicated above the aminolysis may be carried out using either a composition directly resulting from the aforementioned mass thermolysis, i.e., a mixture of cyclic compounds and compounds of Formula (1), or the cyclic compounds which have been separated therefrom.

The general reaction scheme of the aminolysis in the reaction medium is as follows:

The aminolysis reaction may be carried out in mass, or, preferably, in an organic solvent medium (hexane, pentane, toluene, etc.), under anhydrous conditions.

The operation is typically carried out under atmospheric pressure, although lower or higher pressures are also within the scope of this invention.

On the other hand, the aminolysis reactions are characteristically rather exothermic, and it is thus preferred to operate at low temperatures.

The duration of the reaction, depending on the amounts of the reagents introduced, may range from a few minutes to several hours.

In a preferred embodiment of the overall process of the invention, the aminolysis is carried out in the additional presence of a trihalogenoborane of the formula BA$_3$, in which A is a halogen atom.

Thus, it has surprisingly and unexpectedly now been discovered that such co-aminolysis enables the production of polymers having a structure constituting a particularly crosslinked network which imparts great thermal stability during pyrolysis, thereby increasing the yield in boron nitride.

The BA$_3$ compound typically used is trichloroborane BCl$_3$, although any other halogenoborane may be suitable, for example a trifluoro-, tribromo- or triiodoborane.

The proportion of trihalogenoborane in the initial reaction medium may vary over wide limits. In general, it is observed that the higher the proportion of the trihalogenoborane in the reaction medium, the higher the pyrolytic yield in boron nitride of the polymer obtained upon completion of the reaction.

Upon completion of this stage of the reaction, whether or not in the presence of BA$_3$, the polymer is separated from the reaction medium, in particular from the ammonium chlorhydrate formed, by any known means, for example by filtration, or by extraction or decantation, with the aid, in particular, of an ammonia solution.

The polymer recovered in this manner, following the optional elimination of the solvent and drying, constitutes the desired final product.

If necessary, this polymer may be heat treated in a subsequent stage to further improve its pyroysis behavior and, thus, the yield in boron nitride, by weight. This subsequent heat treatment, generally carried out at a temperature of from 100° to 200° C., has the effect of modifying the internal structure of the polymer, likely by increasing the degree of crosslinking, which could explain its improved heat resistance.

The boron and nitrogen based polymers produced according to the invention have a number average molecular weight ranging from 300 to 10,000, preferably from 500 to 1,000.

They also have a weight average molecular weight ranging from 600 to 20,000, preferably from 1,000 to 2,000.

Depending on which process embodiments are employed (whether or not BA$_3$ is used, and, if so, the amount of BA$_3$) the polymers according to the invention may be present, at ambient temperature, in a form varying from a viscous or highly viscous oil to the solid state.

The polymers according to the invention are soluble in most of the usual organic solvents (hexane, toluene, etc.), which may be quite advantageous in the process for the preparation thereof.

The polymers based on boron and nitrogen according to the invention are especially useful in the production of ceramic materials and shaped articles containing, at least in part, boron nitride.

In the most general case (the production of ceramic powders), the polymer is pyrolyzed in an inert atmosphere, in a vacuum or preferably under ammonia, at a temperature ranging from 100° to 2,000° C., until the polymer is converted entirely into boron nitride.

The polymer may be formed prior to pyrolysis, for example by molding or extrusion. If it is desired to produce fibers, the polymer is extruded by means of a conventional extrusion die (optionally after melting, if the polymer is initially in the solid state), then heat treated at a temperature of from 100° to 2,000° C., preferably under an ammonia atmosphere, to yield boron nitride fibers.

The resulting fibers may then be used, e.g., as reinforcing materials for composite materials of the ceramic/ceramic or ceramic/metal type.

In order to further illustrate the present invention and the advantages thereof, the following specific examples are given, it being understood that same are intended only as illustrative and in nowise limitative.

EXAMPLE 1

Into a 500 ml flask and under nitrogen, 266 g of $$\text{Cl} \diagdown \text{B}-\text{N} \diagup \text{SiMe}_3 \atop \text{Cl} \diagup \diagdown \text{SiMe}_3$$

(Me=CH$_3$) were introduced and the mass heated to 200° C. for 42 hours. The evolution of Me$_3$SiCl was detected.

The composition obtained in this manner was evaporated under vacuum.

By this technique, on the one hand a fraction containing Me$_3$SiCl and 96 g of a liquid essentially consisting of $$\text{Cl} \diagdown \text{B}-\text{N} \diagup \text{SiMe}_3 \atop \text{Cl} \diagup \diagdown \text{SiMe}_3$$

(evaporated fraction) were separated, as was, on the other, as the residue, a solid fraction consisting of 86.3 g of a white solid.

The separate yield, of $$\begin{array}{c} \text{B}-\text{N}-\text{SiMe}_3, \\ | \\ \text{Cl} \end{array}$$

units, was on the order of 60%.

The mass spectrometric analysis in a negative ionization mode by electron capture, using air as the reagent mixture (NCI-air) of the solids recovered in this manner evidenced, within said solids, the presence of structural units of the type of [Me$_3$SiN-B-Cl]$_4$ and of the type of [Me$_3$SiNBCl]$_4$+[—CH$_3$+Cl]$_n$, with n=0.1 and 2.

The isotropic units were comparable to those obtained by calculation and permitted determination of cyclical structures of the following types:

(a)

and/or the isomers (b)

and/or the isomers (c)

and/or the isomers

EXAMPLE 2

Into a two liter, double-walled reactor, under nitrogen, 115.8 g of a solid prepared as in Example 1 and 850 ml dry hexane were introduced.

The mixture was cooled to −38° C., then 160 liters ammonia were introduced at a rate of 15 l/h. The temperature increased to about −5° C. and the reaction medium was permitted to warm to ambient temperature under a weak flowstream of ammonia.

A white precipitate consisting principally of ammonium chloride, was formed.

After filtering, rinsing with hexane and evaporation of the solvent, 99.4 g of a clear yellow oil were recovered, constituting a polymer based on boron and nitrogen, according to the invention.

The separate yield of the ammonolysis reaction was practically quantitative, based on the B—NH$_2$—N-SiMe$_3$ unit.

The characteristics of the polymer were the following:

$\overline{Mn}$=460 (number average molecular weight);
$\overline{Mw}$=500 (weight average molecular weight);
IP=1.08 (polydispersibility index);
TGA (under helium at 850° C.)=10%.

EXAMPLE 3

Into a 250 ml flask, under nitrogen, 66.9 g of a polymer prepared according to Example 2, were introduced. The polymer was heated for 6 hours at 160° C. After cooling, 54.0 g of a highly viscous oil were recovered.

The characteristics of the polymer constituting this oil were as follows:
$\overline{Mn}$=550;
$\overline{Mw}$=670;
IP=1.21;
TGA (under He at 850° C.)=16%.

EXAMPLE 4

Into a 2 liter, double-walled reactor, under a flow of nitrogen and at −41° C., 1.70 liter of dry hexane, 60.6 g BCl$_3$, 93.3 g of

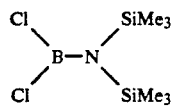

and 92.1 g of a solid as prepared in Example 1 (cyclic polymers), were introduced.

Into this mixture, 207 liters ammonia were introduced at a rate of 45 l/h.

The temperature increased to −5° C. and the reaction medium was permitted to warm to ambient temperature under a weak flowstream of NH$_3$.

After filtering and evaporation of the solvent, 134.5 g of a highly viscous oil were recovered.

The oil was heated to 70° C. for one hour in a vacuum and then permitted to cool to ambient temperature.

128.4 g of an adhesive solid were recovered. The separate yield was 76.1%.

The characteristics of the polymer constituting the solid were the following:
$\overline{Mn}$=840;
$\overline{Mw}$=1420;
IP=1.69;
Softening temperature: 80° C.;
TGA (under He at 850° C.)=30.6%.

EXAMPLE 5

Into a 500 ml flask, 250 g (1.034 mole) of

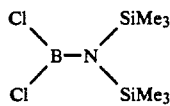

were introduced, which were heat-treated as in Example 1.

The (CH$_3$)$_3$SiCl formed during this reaction was eliminated in a vacuum.

In this manner, 168.7 g of a liquid comprising 42.5% by weight:

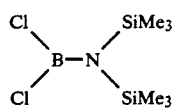

and 57.5% by weight cyclic polymers as described in Example 1, were recovered.

Into a double-walled, 2 l reactor, dried and purged with nitrogen, then cooled to −40° C., the following materials were introduced:
(i) 1 liter dry hexane;
(ii) 161.5 g of the previously obtained liquid; and
(iii) 33.5 g BCl$_3$.

Into this mixture, 13 moles ammonia were introduced over 5 hours.

After filtering in nitrogen, rinsing the cake and evaporation of the solvent, 121.5 g of a slightly yellow, turbid oil were separated.

The yield was 85.8%.

The characteristics of the polymer constituting this oil were the following:
$\overline{Mn}$=660;
$\overline{Mw}$=1030;
Ip=1.55;
TGA (under He at 850° C.)=24.96%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a boron/nitrogen or boron/nitrogen/silicon cyclic preceramic polymer, comprising reacting (a) the product of the bulk thermolysis of a compound of Formula (1):

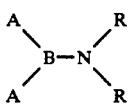

in which A is a halogen atom and R is a hydrogen atom, a hydrocarbon radical, or an organosilyl or hydrogenoorganosilyl radical, with (b) ammonia or an amino compound which comprises at least one —NH$_2$ group.

2. The process as defined by claim 1, wherein the reaction is carried out in bulk.

3. The process as defined by claim 1, wherein the reaction is carried out in solution, in an anhydrous organic solvent.

4. The process as defined by claim 1, wherein the reaction is carried out in the added presence of a trihalogenoborane.

5. The process as defined by claim 4, said trihalogenoborane comprising trichloroborane.

6. The process as defined by claim 1, wherein the compound of formula (1), A is chlorine.

7. The process as defined by claim 1, wherein the compound of Formula (1), R is an alkyl, cycloalkyl, aryl, alkylaryl, arylalkyl, alkenyl or alkynyl radical.

8. The process as defined by claim 1, wherein the compound of Formula (1), R is an organosilyl radical.

9. The process as defined by claim 8, wherein R is a (triorgano)silyl radical.

10. The process as defined by claim 9, wherein R is a (trialkyl)silyl radical.

11. The process as defined by claim 1, wherein said amino compound (b) has the Formula (2):

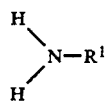

in which $R^1$ is a hydrocarbon radical, or an organosilyl or hydrogenoorganosilyl radical.

12. The process as defined by claim 11, wherein $R^1$ is an alkyl radical.

13. The process as defined by claim 1, wherein said product (a) of the bulk thermolysis is substantially free of compounds of the Formula (1).

14. The process as defined by claim 1, further comprising post-heat treating the product boron/nitrogen polymer from 100°-200° C. for a time sufficient to increase the degree of cross-linking to enhance the heat resistance thererof.

15. A process for the preparation of a cyclic boron/nitrogen and/or boron/nitrogen/silicon polymer, comprising thermolyzing, in bulk, a compound of Formula (1):

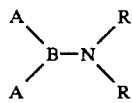

in which A is a halogen atom and R is a hydrogen atom, a hydrocarbon radical, or an organosilyl or hydrogenoorganosilyl radical.

16. The process as defined by claim 16, wherein the compound of Formula (1), A is a chlorine atom.

17. The process as defined by claim 16, wherein the compound of Formula (1), R is an alkyl, cycloalkyl, aryl, alkylaryl, arylalkyl, alkenyl or alkynyl radical.

18. The process as defined by claim 16, wherein the compound of Formula (1), R is an organosilyl radical.

19. The process as defined by claim 18, wherein the compound of Formula (1), R is a (triorgano)silyl radical.

20. The process as defined by claim 19, wherein the compound of Formula (1), R is a (trialkyl)silyl radical.

* * * * *